United States Patent [19]

VanBerg et al.

[11] Patent Number: 5,252,918
[45] Date of Patent: Oct. 12, 1993

[54] APPARATUS AND METHOD FOR ELECTROMAGNETICALLY DETECTING THE PASSING OF A PLUG RELEASED INTO A WELL BY A BRIDGE CIRCUIT

[75] Inventors: Charles F. VanBerg, Duncan; James L. Davis, Marlow, both of Okla.

[73] Assignee: Halliburton Company, Duncan, Okla.

[21] Appl. No.: 812,199

[22] Filed: Dec. 20, 1991

[51] Int. Cl.⁵ .................. G01B 7/14; G01R 33/12
[52] U.S. Cl. .................. 324/207.19; 324/207.22; 324/226; 324/234; 166/255
[58] Field of Search .............. 324/207.22, 207.16, 324/207.19, 234, 225, 226, 236, 238, 259; 166/255

[56] References Cited

U.S. PATENT DOCUMENTS

| 2,201,311 | 5/1940 | Halliburton | 181/0.5 |
|---|---|---|---|
| 3,116,452 | 12/1963 | Schmidt . | |
| 3,562,636 | 2/1971 | Huber . | |
| 3,684,961 | 8/1972 | Muir . | |
| 3,694,740 | 9/1972 | Bergstrand . | |
| 3,843,923 | 10/1974 | deVries et al. . | |
| 3,878,453 | 4/1975 | Potter et al. . | |
| 3,883,797 | 5/1975 | Abrukin . | |
| 4,023,092 | 5/1977 | Rogers . | |
| 4,038,609 | 7/1977 | Langberg | 331/65 |
| 4,206,810 | 6/1980 | Blackman | 166/336 |
| 4,468,967 | 9/1984 | Carter, Jr. | 73/661 |
| 4,591,788 | 5/1986 | Mohri et al. | 324/253 X |
| 4,638,278 | 1/1987 | Bullock | 335/207 |
| 4,694,283 | 9/1987 | Reeb | 340/572 |
| 4,792,790 | 12/1988 | Reeb | 340/572 |
| 4,835,524 | 5/1989 | Lamond et al. | 340/572 |
| 4,847,552 | 7/1989 | Howard | 324/67 |
| 4,851,815 | 7/1989 | Enkelmann | 340/571 |
| 4,857,851 | 8/1989 | Anderson et al. | 324/326 |
| 4,906,927 | 3/1990 | Urata et al. | 324/238 |
| 4,928,520 | 5/1990 | Barrington | 73/151 |
| 4,972,198 | 11/1990 | Feltz et al. | 343/742 |
| 4,990,891 | 2/1991 | Reeb | 340/572 |
| 5,006,800 | 4/1991 | Hedengren et al. | 324/233 |

OTHER PUBLICATIONS

"Review On Recent Advances In The Field of Amorphous-Metal Sensors and Transducers", *IEEE Transactions On Magnetics,* vol. mag-20, No. 5 (Sep. 1984).
"Soft Magnetic Materials", *Proceedings Of The IEEE,* vol. 78, No. 6 (Jun. 1990).
"Amorphous Magnetic Materials", *Encyclopedia of Chemical Technology With Interscience,* vol. 2, 3rd. Ed.

Primary Examiner—Gerard R. Strecker
Assistant Examiner—Warren S. Edmonds
Attorney, Agent, or Firm—James R. Duzan; E. Harrison Gilbert, III

[57] ABSTRACT

A plug released into an oil or gas well carries one or more metallic strips that affect the inductance of a resistive-inductive bridge circuit mounted adjacent a conduit through which the plug and fluids are pumped into the well. This unbalances the bridge circuit to produce a signal preferably uniquely identified with the plug so that an indicator can be activated to confirm proper release of the plug into the well. When an amorphous metal is used in the metallic strips, the unbalancing of the bridge produces a signal having an identifiable harmonic of a fundamental frequency of an oscillator signal driving the bridge circuit, which harmonic is not present in other signals resulting from the bridge circuit being unbalanced by other materials flowing in the conduit.

32 Claims, 11 Drawing Sheets

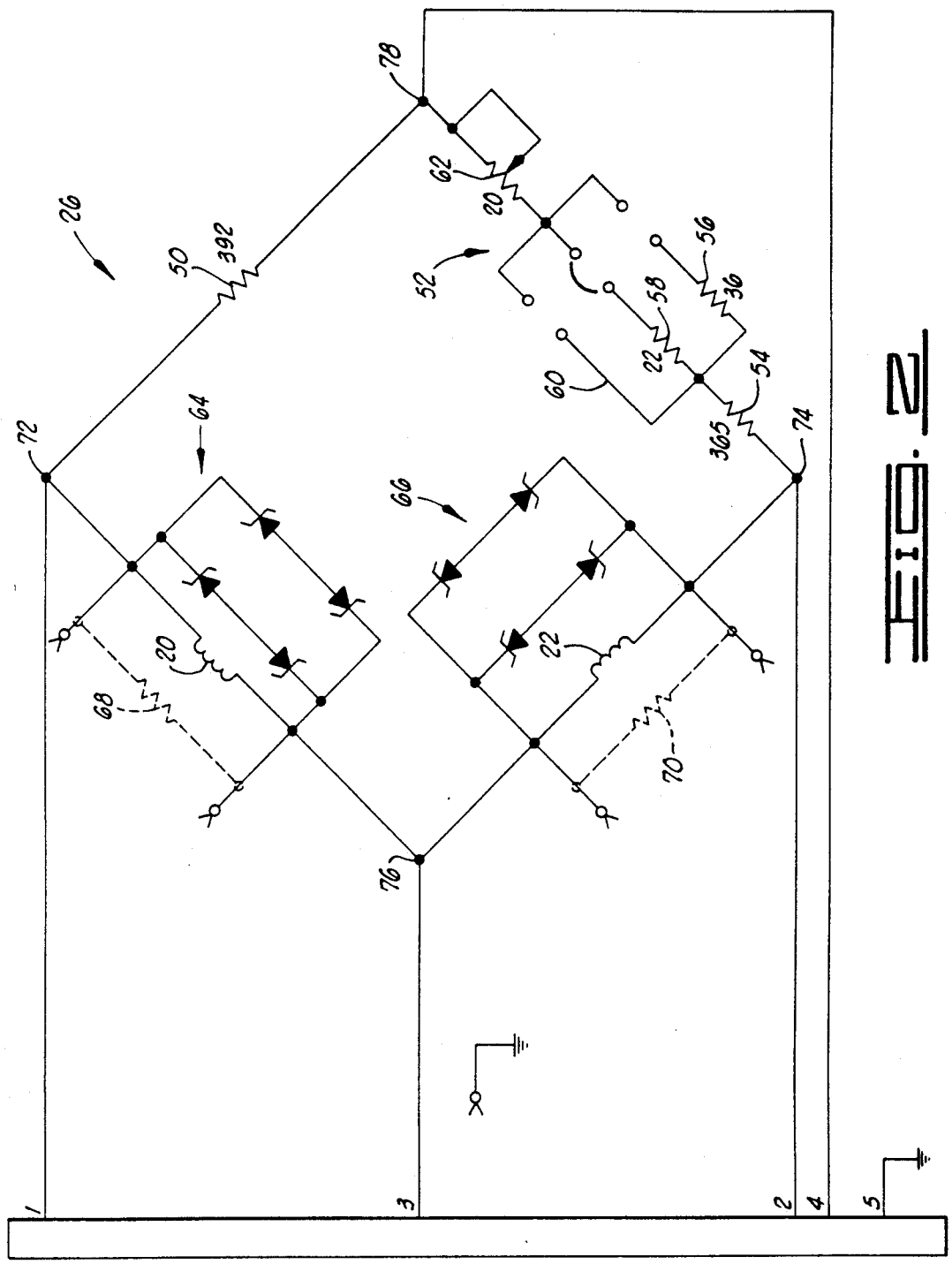

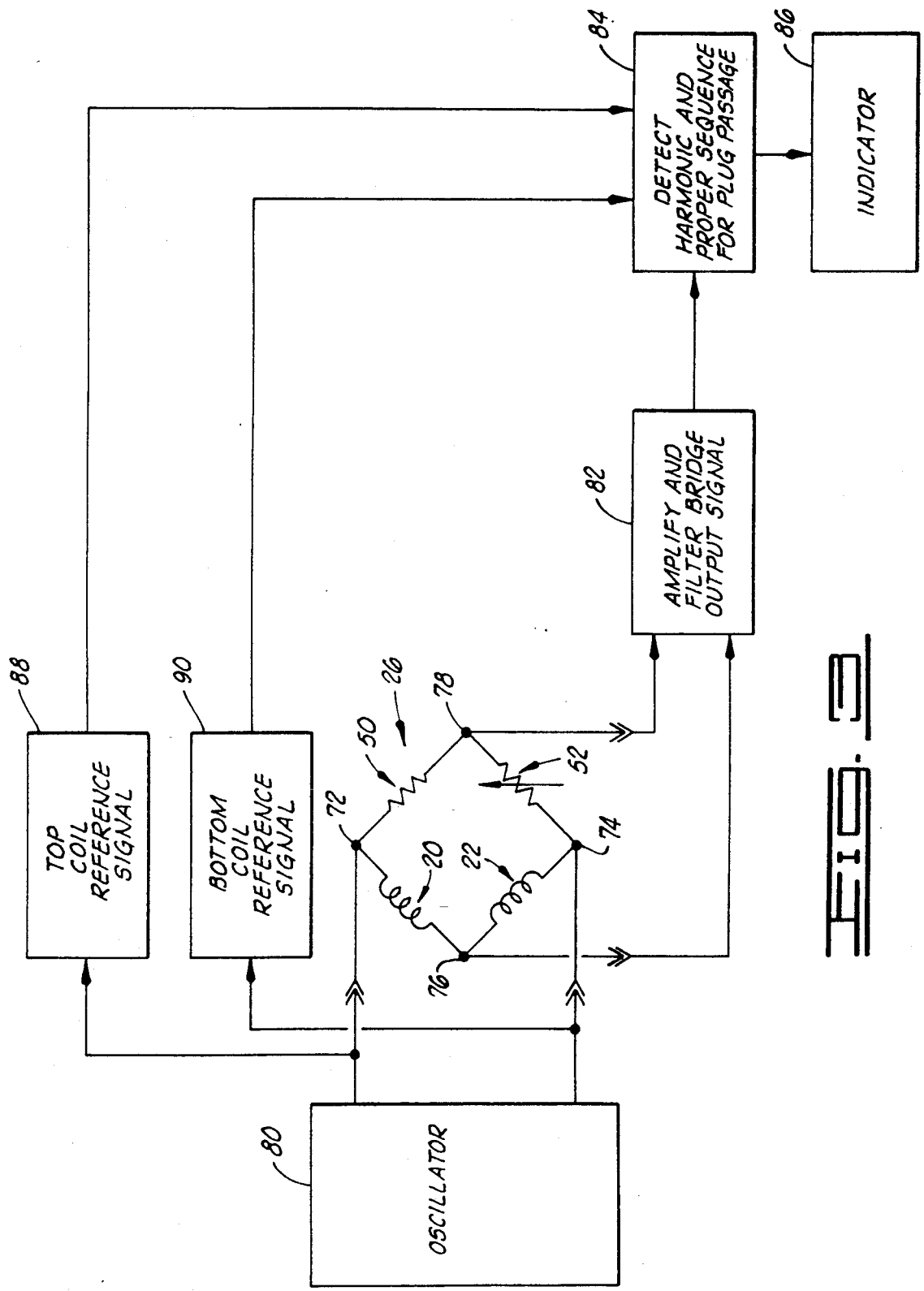

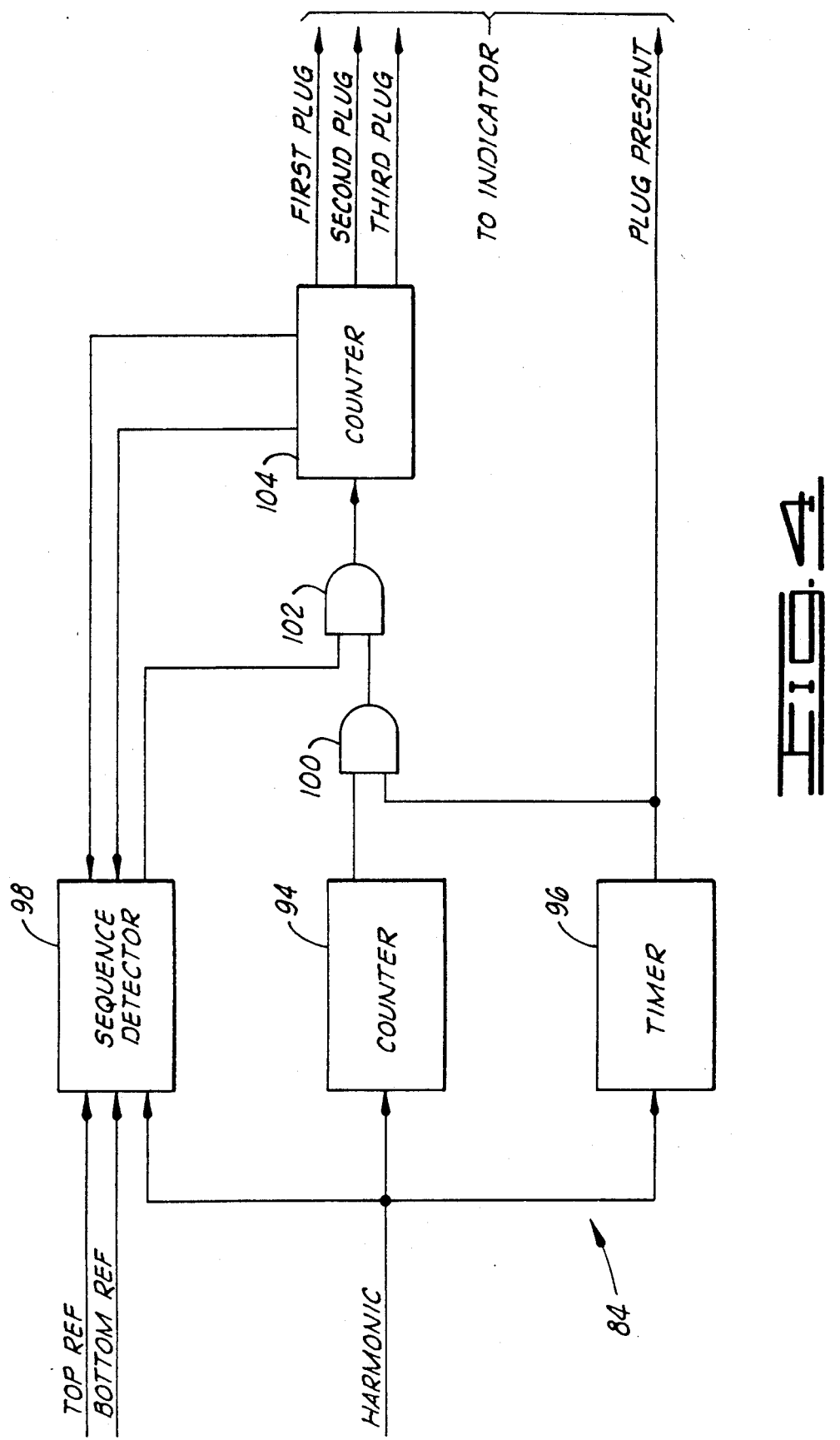

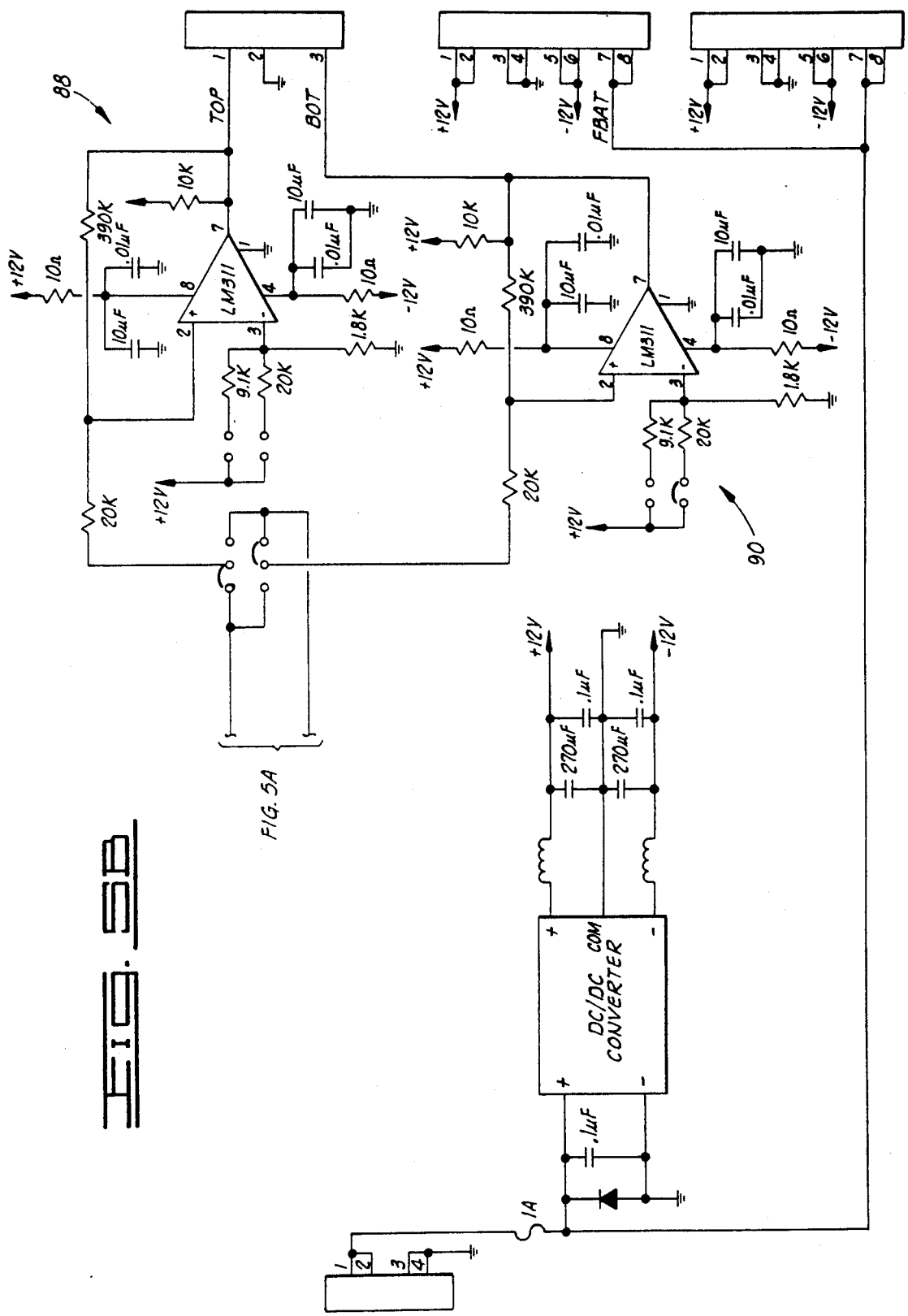

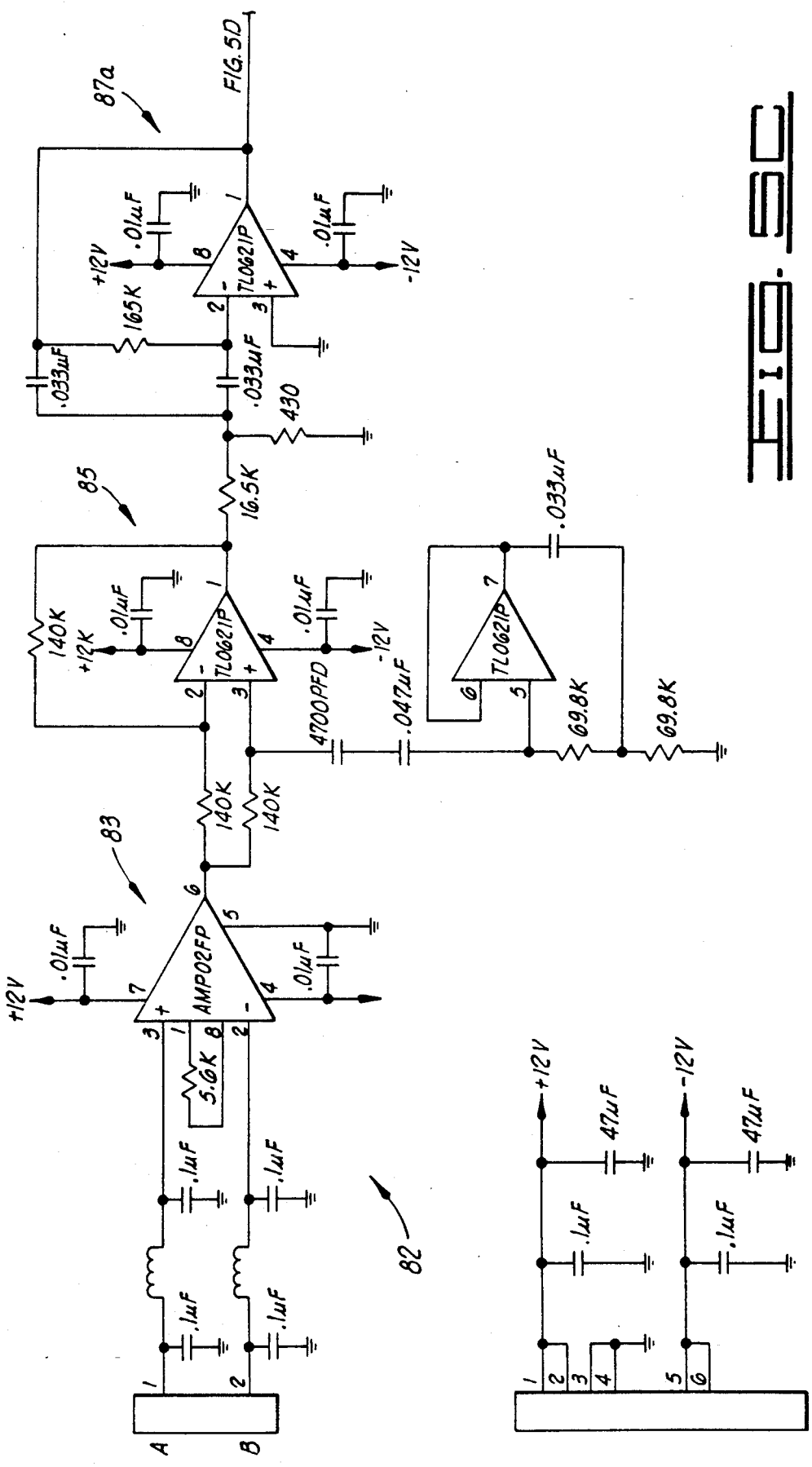

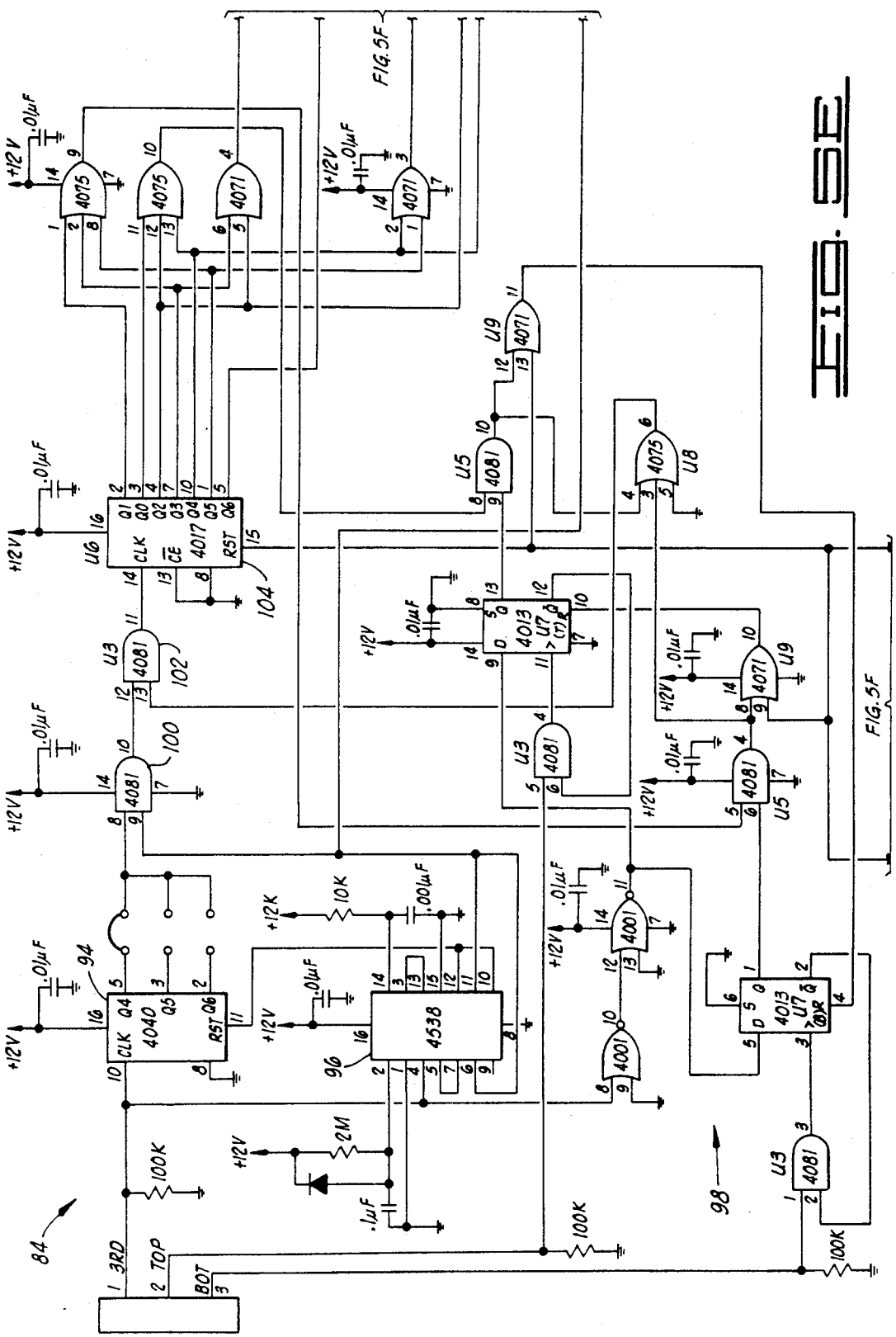

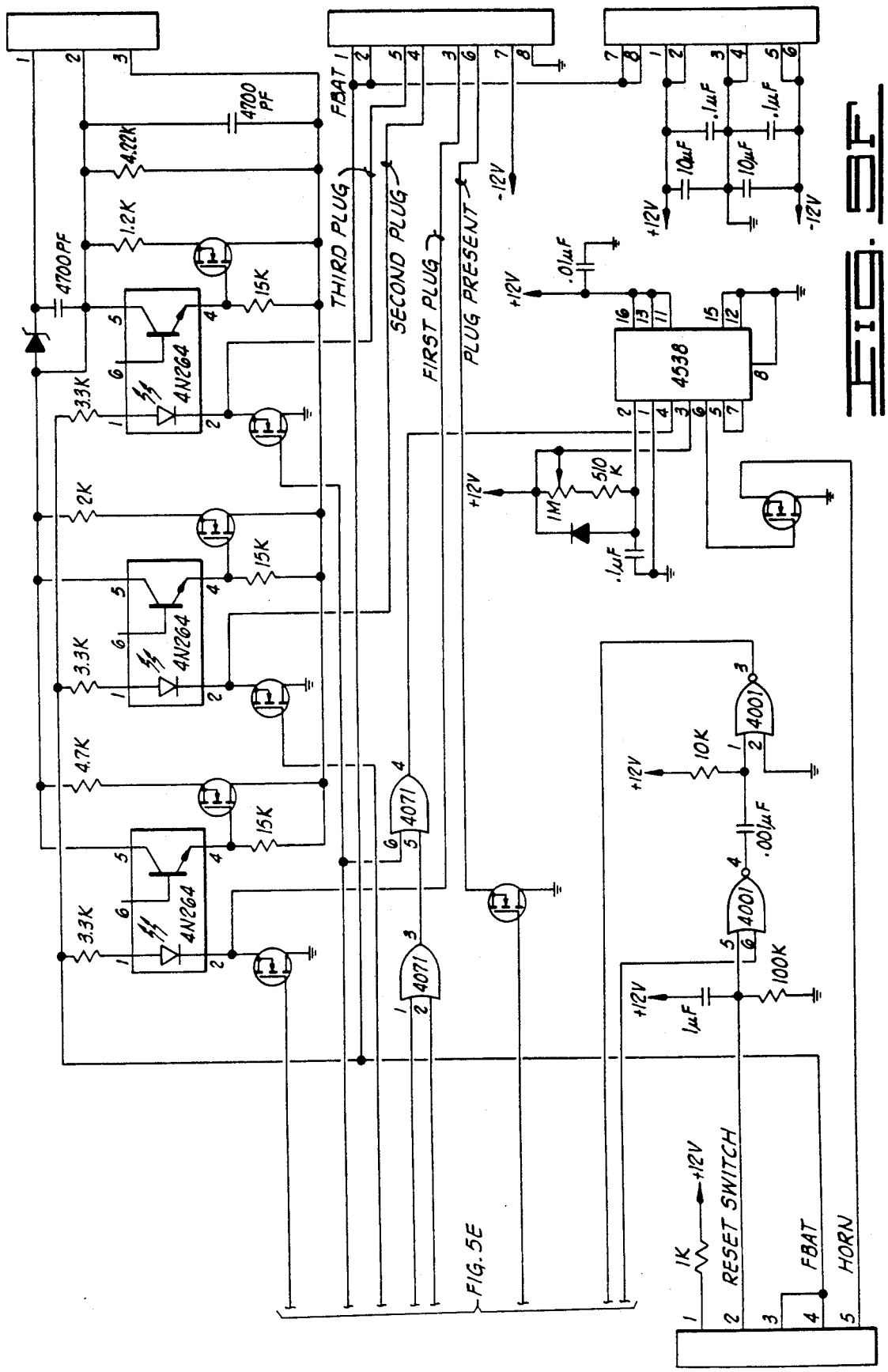

APPARATUS AND METHOD FOR ELECTROMAGNETICALLY DETECTING THE PASSING OF A PLUG RELEASED INTO A WELL BY A BRIDGE CIRCUIT

BACKGROUND OF THE INVENTION

This invention relates generally to detecting the passing of a plug released into a well. The plug typically is a cementing plug pumped into an oil or gas well with cement and other fluids containing various materials, and the invention preferably is able to distinguish when the cementing plug rather than other material passes a particular location.

To support the upper part of an oil or gas well, a string of tubular segments called casing is typically cemented into place at the top of the well bore. The casing is lowered into the bore and then cement is pumped down the center of the casing and back up the annulus between the outside of the casing and the surface of the well bore. To move a desired amount of cement up into the annulus without leaving the interior of the casing filled with cement, a cementing plug is released from a closed plug container into the casing behind the cement once the volume of cement necessary to fill the annulus has been pumped into the well; and then a displacing fluid, which will not solidify inside the well, is pumped in on top of the cementing plug to push the cement into the annulus. The cementing plug separates the different fluids. Additional plugs and fluids can be used in series.

Because the fluids and plugs are moved into the well through a closed, pressurized system, an operator typically cannot directly see a plug release from the plug container and enter the fluid stream at the desired time. To know that a plug has actually entered the fluid stream is important because if the plug is not properly placed but the following fluid is pumped anyway, the following fluid may be pumped directly against the leading fluid thereby allowing possibly deleterious mixing of the different fluids. Additionally, if the plug is not properly placed, it will not be at the appropriate place to hit bottom and cause a detectable pressure increase for alerting an operator that displacement is complete; therefore, without such pressure increase signal being generated, over or under displacement of the fluid can result. Accordingly, there is the need for an apparatus and method for detecting that the plug has been properly released into the fluid stream.

Although the foregoing is known in the oil and gas industry and attempts have been made to provide plug detector apparatus and methods, there is the need for an improved apparatus and method. Such an apparatus and method should be non-invasive. That is, they should not mechanically cross the interior surface defining the closed flow path through which the plug and fluids move, thereby avoiding sealing problems. Such an apparatus and method should preferably distinguish the plug from other objects or materials in the flow. They also should preferably sense proper direction of plug movement. Furthermore, such apparatus and method preferably should use relatively low energy.

SUMMARY OF THE INVENTION

The present invention meets the aforementioned needs and others by providing a novel and improved apparatus and method for detecting the passing of a plug released into a well. In meeting these needs in its preferred embodiment, the present invention electrically responds to metal moving through the flow path, but particularly distinguishes an amorphous metal carried on a cementing plug from other metals typically found in cement and other fluids used in oil or gas wells.

The present invention broadly provides an apparatus for detecting the passing of a plug released into a well, which apparatus comprises: an electrical bridge circuit including a first electrical coil and a second electrical coil spaced at fixed locations along a course through which the plug passes; and at least one metallic member mounted on the plug so that the at least one metallic member passes in effective proximity to both of the first and second electrical coils as the plug passes the first and second electrical coils. The metallic member preferably includes means for reacting with the first and second electrical coils so that an electrical output signal from the electrical bridge circuit is produced having an identifiable harmonic of a fundamental frequency of an electrical input signal to the electrical bridge circuit as the plug passes each of the first and second electrical coils.

The present invention also provides a method of detecting a plug passing a predetermined location along a flow path into a well. The method comprises: generating an electrical signal having a fundamental frequency; driving a normally balanced electrical bridge circuit, connected adjacent the flow path, with the electrical signal so that an output signal is provided from the bridge circuit when the bridge circuit becomes unbalanced in response to metal moving through the flow path past the bridge circuit; producing in the output signal from the bridge circuit a harmonic of the fundamental frequency in response only to the plug passing the bridge circuit; and sensing the harmonic in the output signal. The method preferably further comprises: sensing that the output signal changes in a predetermined sequence relative to upper and lower electrical coils of the bridge circuit mounted along the flow path; and indicating the passing of the plug in response only to both sensing the harmonic in the output signal and sensing the output signal changing in the predetermined sequence.

Therefore, from the foregoing, it is a general object of the present invention to provide a novel and improved apparatus and method for detecting the passing of a plug released into a well. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 2 is a schematic circuit diagram of an electrical bridge circuit including the two electrical coils depicted in FIG. 1.

FIG. 3 is a schematic and block diagram of an electrical circuit of the preferred embodiment of the present invention.

FIG. 4 is a block diagram of the preferred embodiment of a discrimination circuit which detects a predetermined harmonic and proper sequencing of an output signal indicating proper plug passage as identified in FIG. 3.

FIGS. 5A-5F are schematic circuit diagrams of a particular implementation of the preferred embodiment electrical circuits represented in FIGS. 3 and 4.

DETAILED DESCRIPTION OF PREFERRED EMBODIMENT

Figure 1A:
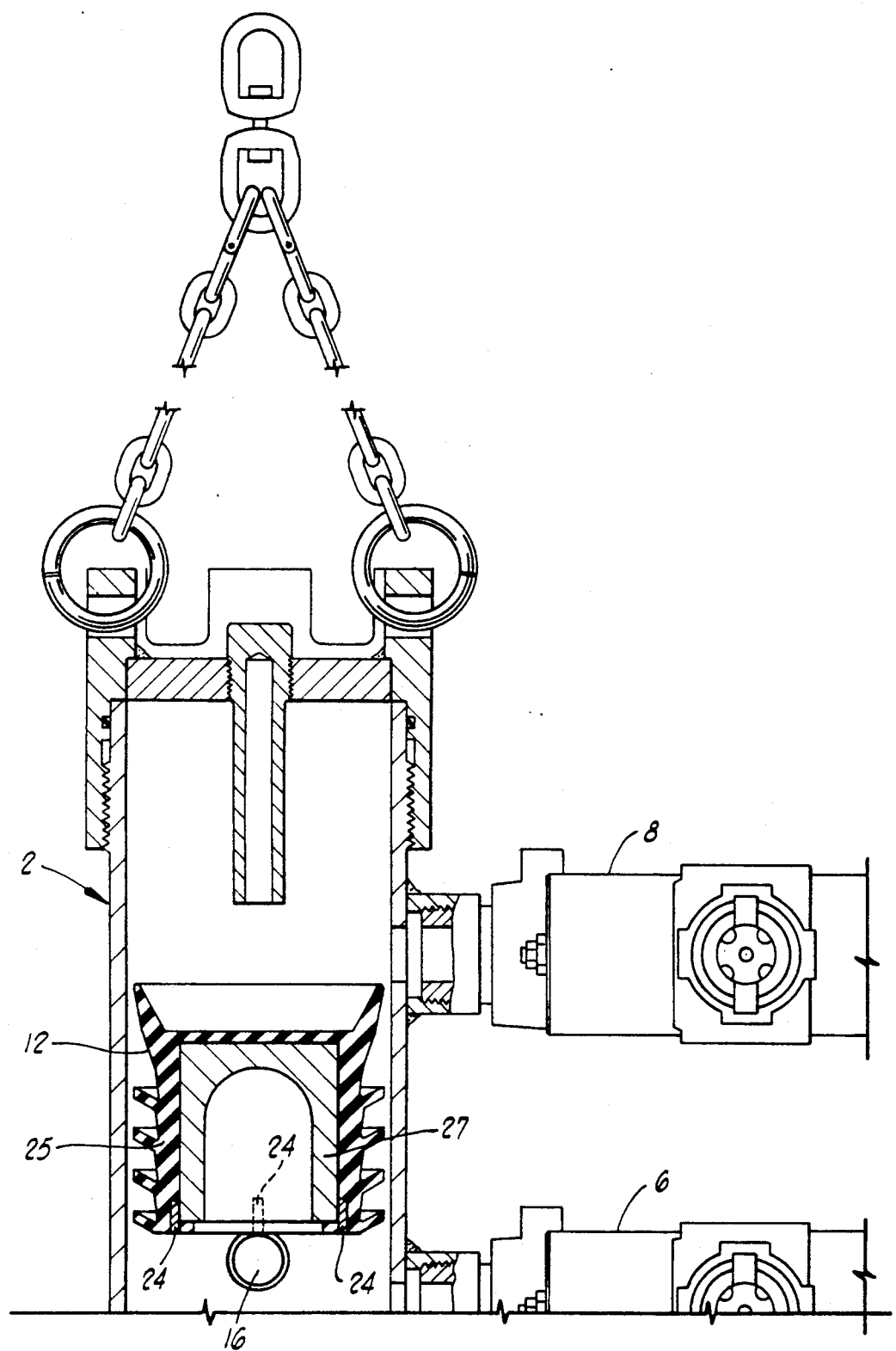
FIGS. 1A-1B show a sectioned elevational view of two cementing plugs retained in a plug container connected to a well through an adapter coupling containing two electrical coils in accordance with the preferred embodiment of the present invention.
Figure 1B:
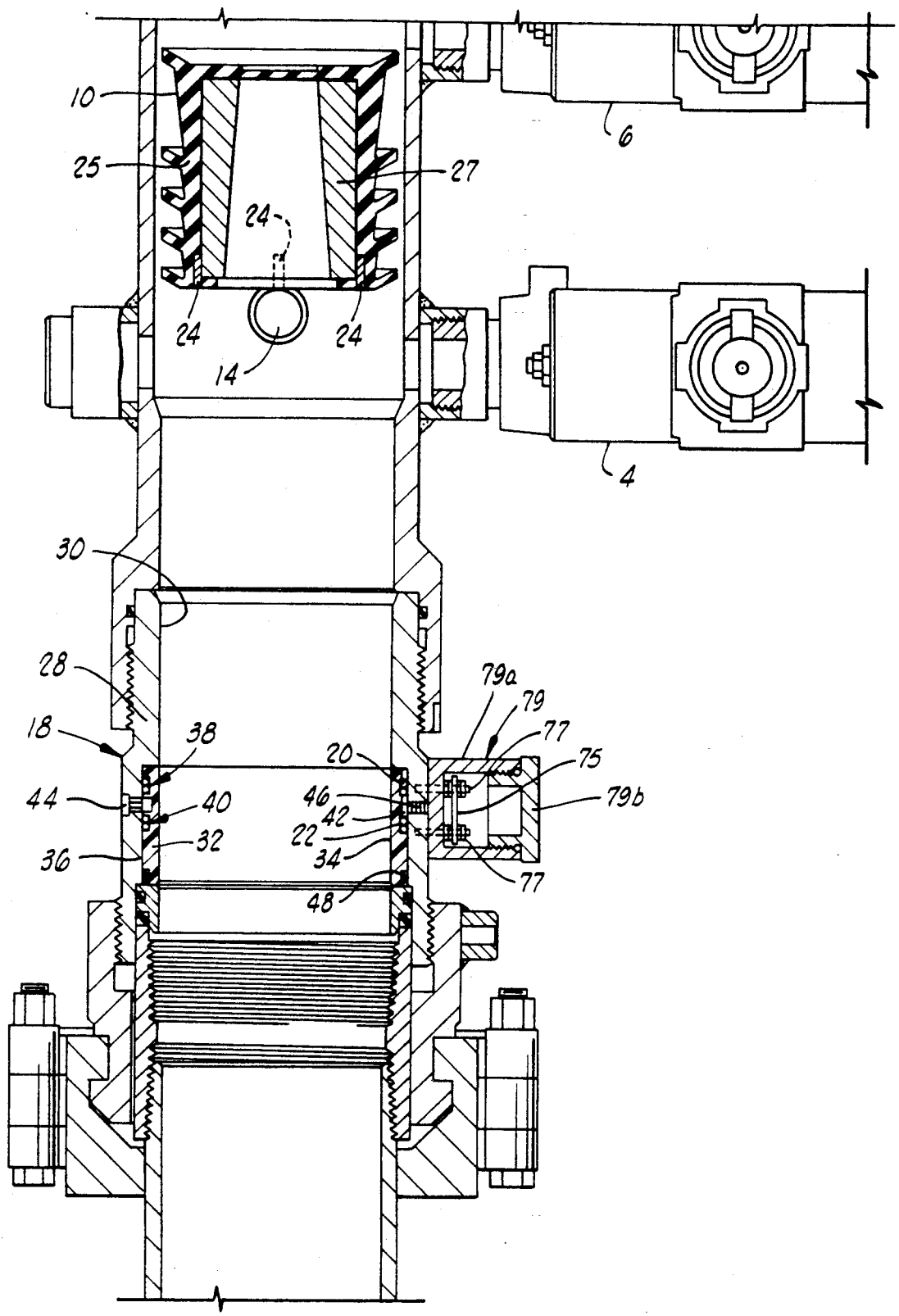

Referring to FIGS. 1A-1B, a conventional plug container 2 has conventional valves 4, 6, 8 connected to it and cementing plugs 10, 12 retained in it by plungers 14, 16, respectively, of conventional plug release plunger assemblies (not otherwise shown). The plug container 2 is connected to an oil or gas well in a conventional manner except that an adapter coupling member 18, onto which the lower end of the plug container 2 is screwed, is modified to carry two electrical coils 20, 22 as will be more fully described below.

Each plug 10, 12 is typically a conventional plug for separating cement and other fluids which are to be pumped into the well in series, except that plugs for the present invention include one or more metallic members 24 (three shown in FIG. 1 and a fourth one is in the portion of each plug sectioned out of FIG. 1). The metallic members 24 are mounted on a respective plug so that the metallic members pass in effective proximity to both of the electrical coils 20, 22 when the plug is released and dropped or pumped past the coils 20, 22 into the well. "Effective proximity" means that the metallic members can affect an electrical characteristic (inductance in the preferred embodiment) of an electrical circuit in which the electrical coils 20, 22 are connected as further explained below. In the illustrated preferred embodiment, each metallic member 24 is a thin strip inserted into the outer sealing body 25 (such as made of rubber) adjacent the inner core 27 (such as made of aluminum) of each plug. Each metallic member 24 is preferably small to keep the cost down and to facilitate the plug being drilled out after the cementing job is completed.

Each metallic member 24 includes a material by which the aforementioned effect on an electrical characteristic can be obtained. In the preferred embodiment, the material is such that as it passes the coils 20, 22, it electrically reacts with the coils 20, 22 to change the impedance, and specifically the inductance, of a bridge circuit 26 (FIG. 2) in which the coils 20, 22 are connected so that an electrical signal output from the bridge 26 has an identifiable harmonic of a fundamental frequency of a signal driving the bridge 26. That is, the bridge output signal is produced with such a harmonic frequency in response to a plug with at least one metallic member 24 passing the coils 20, 22. Each member 24 preferably includes an amorphous metal having a sharp (i.e., more nearly square shaped) B-H response curve so that the harmonic change in the bridge output signal can be obtained at a relatively low input energy. Other materials for the members 24 can be used in the present invention, but such other materials may require that a higher energy driving signal be input to the bridge circuit to obtain a suitable output signal. The amorphous metal preferably includes an (i.e., one or more) element from the group consisting of nickel, iron, molybdenum, chromium, silicon, cobalt, boron, carbon and manganese. Specific amorphous metal alloys include the following from Allied Signal, Inc., Metglas Division: TCA 2605S-2, 2605SC, 2605S-3A, 2605CO, 2605SM, 2705M, 2714A, 2826MB, 2705MN. Presently preferred ones are the 2705M and 2714A alloys.

Referring to FIG. IB, the modified adapter coupling 18, through which the plugs with their metallic members 24 move in passing the coils 20, 22, includes a housing 28 adapted to be connected to the well in a conventional manner as illustrated in the drawing. The inner axial cavity of the housing 28 is defined by a stepped inner surface 30 having three progressively greater diameters from top to bottom as oriented in FIG. IB. The middle portion of the surface 30 receives a cylindrical sleeve 32 having an interior surface 34 aligned with the narrowest portion of the surface 30. These aligned axial openings are large enough to allow the plugs 10, 12 to pass through in series.

The sleeve 32 has a radially outer surface 36 in which two circumferential grooves 38, 40 are defined. A longitudinal slot 42 extends between the grooves 38, 40. The coil 20 is disposed in the groove 38, and the coil 22 is disposed in the groove 40. Ends of the coils 20, 22 are laid in the slot 42 for connecting them outside the housing 28 both serially together and into the bridge 26. Passage out of the housing 28 is through one or more radial holes 46 in the housing 28. A radial hole 44 in the housing 28 provides a vacuum purge port used for final potting of the coils. A seal 48 is carried near the bottom of the sleeve 32 for sealing during a vacuum purge.

In a particular implementation, the grooves 38, 40 have equal radii so that the coils wound in them will likewise have equal radii. The longitudinal or axial spacing between the grooves, and thus between the coils, is equal to one coil radius in the preferred embodiment. This provides a Helmholtz coil configuration which produces uniform magnetic fields along the center of the coil assembly. When a plug containing a metallic member 24 moves through this configuration, a phase change occurs in the signal output from the bridge 26 to indicate the direction the plug is moving in the coils; when the preferred embodiment metallic member 24 is present, the output signal also includes the aforementioned harmonic frequency.

Each of the coils 20, 22 in the particular implementation includes 310 turns of TM 28 AWG film insulated magnet wire. By being mounted in the grooves 38, 40, the coils 20, 22 are longitudinally spaced at fixed locations outside but along the course or path through which each plug passes. Thus, the coils 20, 22 have inner diameters greater than the outer compressed diameters of the plugs 10, 12.

The series connected coils 20, 22 are connected in electrical parallel to series connected resistances 50, 52 of the bridge circuit 26 as shown in FIG. 2. In the particular implementation of FIG. 2, the resistance 50 is defined by a fixed resistor and the resistance 52 is defined by series connected fixed resistor 54, selectable parallel coarse adjustment fixed resistors 56, 58 (and selectable short circuit 60), and fine adjustment variable resistor 62. Protective Zener diode circuits 64, 66 are connected in parallel with the coils 20, 22, respectively. Resistances can be added in parallel with each coil 20, 22 as illustrated at 68, 70 in FIG. 2.

The bridge 26 has inputs 72, 74 where a driving signal is applied. The bridge has outputs 76, 78 where an output signal is provided. When a driving signal is applied to inputs 72, 74 and the bridge is electrically balanced in known manner by appropriately matching inductances and resistances, no output signal is provided across outputs 76, 78. "No output" means no significant output signal providing any meaningful indication of bridge unbalance. When a driving signal is applied to inputs 72, 74 and there is an unbalance such as due to a plug with a metallic member 24 passing through at least one of the coils 20, 22, an output signal is provided across the outputs 76, 78.

Except for the coils 20, 22, the components shown in FIG. 2 are mounted on a circuit card 75 (FIG. 1B) retained by set screw/nut/washer elements 77 inside a sealed housing 79 (having a body 79a and a threadedly connected O-ring carrying lid 79b) mounted on the adapter coupling 18.

Figure 5A:
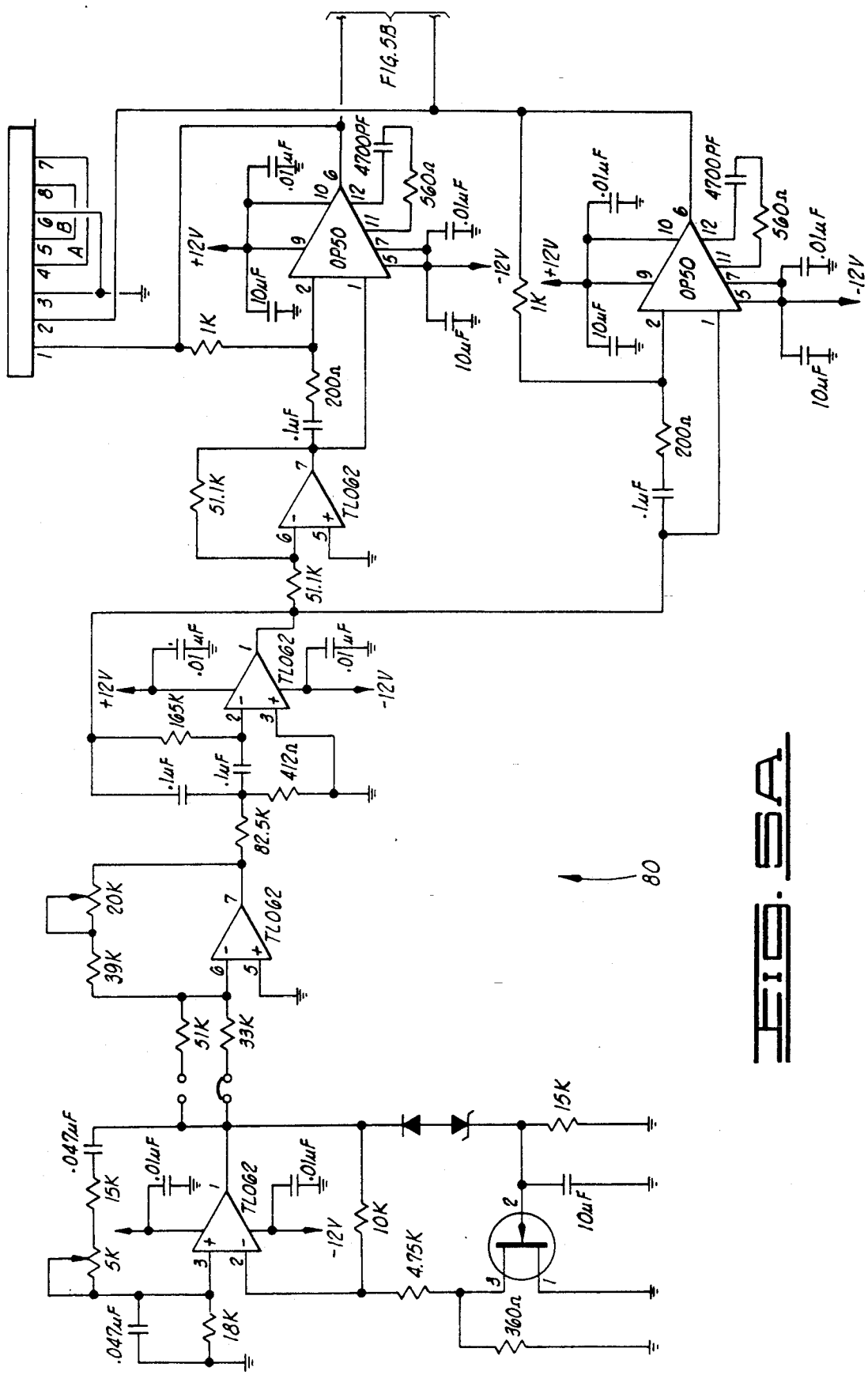

In the preferred embodiment, the bridge circuit 26 receives its driving signal from an oscillator 80 connected to the bridge inputs 72, 74 in electrical parallel with the coils 20, 22 and the resistances 50, 52 as represented in FIG. 3. A particular implementation for the oscillator 80 is shown in FIG. 5A. The oscillator 80 provides a time-varying electrical signal in known manner. In the preferred embodiment, this signal has a sinusoidal waveform with a fundamental frequency. The oscillator implementation of FIG. 5A is a low distortion oscillator so that it provides a high purity driving signal having only the desired fundamental frequency. Also in the implementation of FIG. 5A, both sine and cosine waveforms are provided, one supplied to the bridge input 72 and the other provided to the bridge input 74.

Figure 5D:
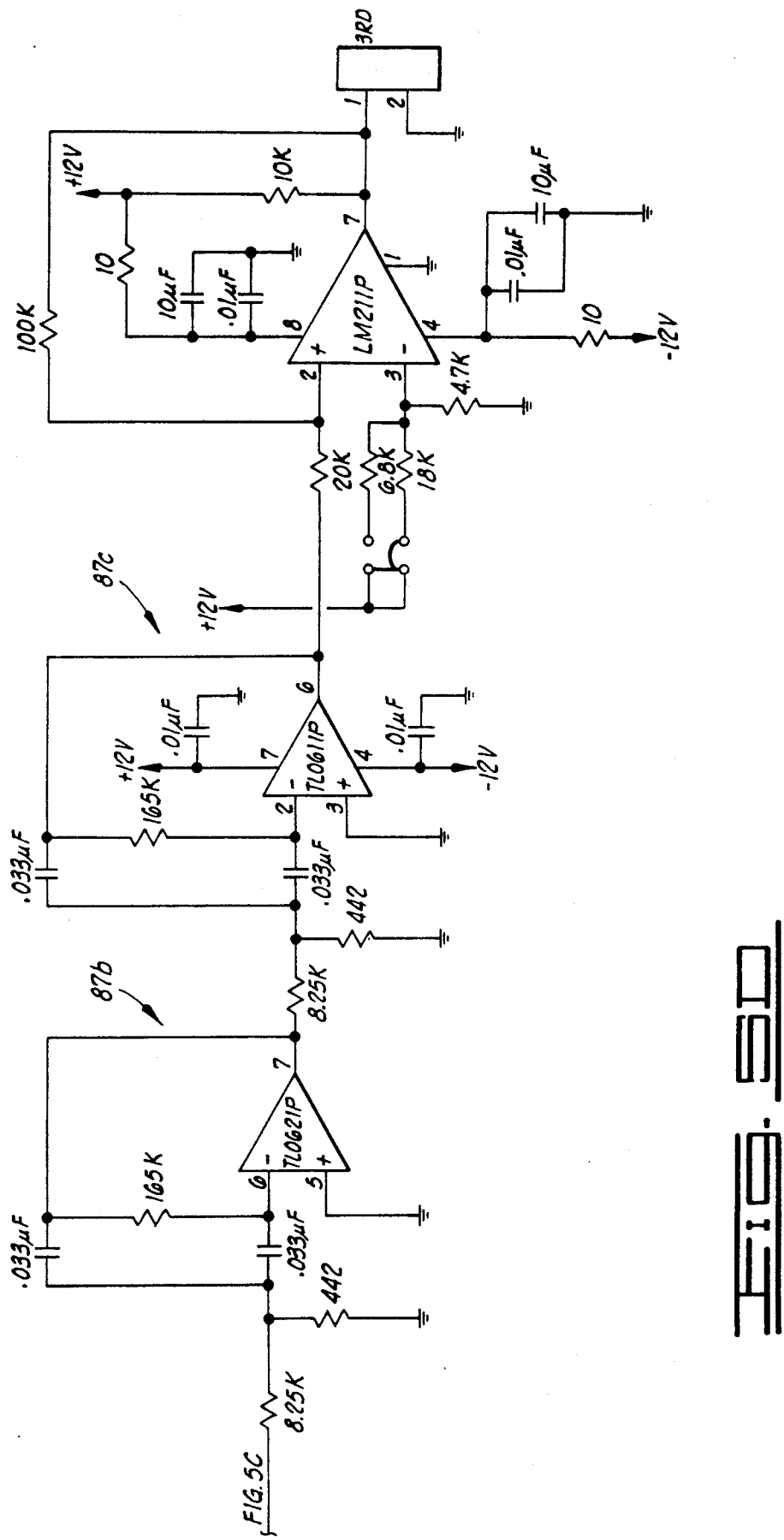

Whether the bridge 26 is balanced or unbalanced is sensed by output circuitry connected to outputs 76, 78 as shown in FIG. 3. Any signal sensed across the outputs 76, 78 is amplified and filtered by circuit 82 generally represented in FIG. 3 and particularly implemented as illustrated in FIGS. 5C and 5D. In the particular implementation in FIGS. 5C and 5D, a differential input instrumentation amplifier 83 amplifies any unbalanced portion of the output signal from the bridge 26. A notch filter 85 attenuates the fundamental frequency component of the amplified output signal. Three bandpass filters 87a, 87b, 87c amplify the third harmonic component, if any, in the amplified, notch filtered output signal. These bandpass filters have a Q of 10.

A discriminator circuit 84 (FIG. 3) then determines whether the amplified and filtered signal has the requisite harmonic of the fundamental frequency of the driving signal from the oscillator 80 indicative of plug passage. If so, visual and/or audible signals are generated by an indicator circuit 86 (FIG. 3). It is also possible to use amplitude or phase detection to detect whether something has passed the coils 20, 22; however, using the preferred metallic members 24 and sensing for a particular harmonic allows for improved discrimination to indicate specifically that a plug has passed.

The preferred embodiment further refines the discrimination sensitivity of the present invention by indicating that a plug has passed only when both the predetermined harmonic is detected and a proper sequencing past both coils 20, 22 is detected; however, sensing proper sequencing is not a limitation of the broader aspects of the present invention. When it is used, sequence sensing occurs in response to receiving two reference signals, one relative to the coil 20 and the other relative to the coil 22, from circuits 88, 90 connected to the respective outputs of the oscillator 80 as generally illustrated in FIG. 3 and as shown in a specific implementation in FIG. 5B. These reference signals are used in the control of the discriminator circuit 84.

Referring to FIG. 4, the discriminator circuit 84 includes a counter 94, a timer 96 and a sequence detector 98 which are responsive to the filtered signal from the amplify and filter circuit 82. If there is a pulse in the filtered signal, the timer 96 is triggered to start a timing period and to turn on an indicator signifying that a plug is present. The counter 96 counts the pulses in the filtered signal. If a predetermined number of pulses are counted within the timing period, a signal is generated at the output of AND gate 100 and input to AND gate 102 confirming that a plug has been detected. If the sequence detector 98 senses proper sequencing from the top and bottom reference signals in combination with the filtered signal and feedback signals from a counter 104, it provides a signal to AND gate 102. When both the required harmonic in the filtered signal and the required sequence are detected as indicated by the signals input to AND gate 102, AND gate 102 outputs a signal that increments the counter 104. The counter 104 keeps track of how many plugs have been detected. The counter 104 is set up to track how many plugs are intended to be released during a particular operation. For example, if two plugs are to be released, the counter 104 is, upon detection of the first plug, incremented to provide an output signal that activates an indicator signifying the first plug has properly released; the counter 104 is next, upon detection of the second plug, incremented to provide an output signal that activates an indicator signifying the second plug has been released; the counter 104 is then reset. A particular implementation of the discriminator circuit 84 is shown in FIG. 5E. This particular implementation is set up for a sequence of three plugs.

Referring to FIG. 5E, latches "BOT" and "TOP" [U7(T) and U7(B)] are normally reset to an initial condition where $\overline{Q}=1$ and $Q=0$ by a power-up reset or by a manual reset switch. This reset comes into the pins (10 and 4) designated by R of U7.

Latch "TOP" [U7(T)] can be latched by a harmonic pulse (high logic level) on pin 9 of U7 and a reference "TOP" pulse to pin 5 of U3. Once latched ($\overline{Q}=0$, and $Q=1$), this latch will remain in this state until reset. If the sequence is correct (either $Q_0$, $Q_2$, or $Q_4$ of U6 is high), then a high is obtained on pin 10 of U5, pin 11 of U9, pin 6 of U8, pin 11 of U3, and pin 4 of U7. Therefore counter 104(U6) is advanced one count, and latch "BOT" is reset.

Latch "BOT" [U7(B)] can be latched by a harmonic pulse (high logic level) on pin 5 of U7 and a reference "BOT" pulse to pin 1 of U3. Once latched ($\overline{Q}=0$, and $Q=1$), this latch will remain in this state until reset. If the sequence is correct (either $Q_1$, $Q_3$, or $Q_5$ of U6 is high), then a high is obtained on pin 4 of U5, pin 10 of U9, pin 10 of U7, pin 6 of U8, and pin 11 of U3. Therefore counter 104 is advanced one count, and latch "TOP" is reset.

Counter 104 is initialized to $Q_0=1$ by a reset (power-up or manual reset). The first activation by coil 20 (indicated via latch "TOP") will advance the count to $Q_1=1$. Then if coil 22 is activated (indicated via latch "BOT"), the count is advanced to $Q_2=1$, and the first plug indicator will be turned on. If coil 20 is activated again, the count will advance and $Q_3=1$ and the first plug indicator will still be turned on. The second activation by coil 22 in sequence will advance the count and $Q_4=1$. The first plug indicator will be turned off, and the second plug indicator will be turned on. A third plug, if used, will advance the count in the same manner. However the count is now 6 (or $Q_6=1$), and no further sequencing can occur until a reset occurs.

To use the present invention, the modified plugs 10, 12 and the modified adapter coupling 18 are installed in a known manner. Mounted in the enclosure 79 attached to the adapter coupling 18 are the components of the bridge circuit 26 shown in FIG. 2 except for the coils 20, 22, which are inside the adapter coupling 18 as described above. The remaining circuits shown in FIG. 3 are remote from the assembly shown in FIGS. 1A–1B, but they are connected by suitable wires to form the overall circuit shown in FIG. 3.

To initialize the circuit, the oscillator is turned on and the resistance 52 is adjusted to obtain a quiescent null condition (i.e., no bridge output signal with nothing being pumped past the coils 20, 22). The oscillator remains on while a cementing job is performed.

During a cementing job, fluid, such as a drilling fluid, is pumped in through valve 4. When that has been completed, the plunger 14 is retracted to release the plug 10. Then the valve 4 is closed and the valve 6 is opened, and a fluid, such as a Class H cement slurry, is pumped in on top of the plug 10 so that this fluid is separated from the fluid pumped in below the plug 10. The present invention determines, in the manner explained above and summarized below, if the plug 10 has properly entered the flow path.

If the cementing job continues, the plunger 16 is retracted to release the plug 12. Then the valve 6 is closed and the valve 8 is opened so that fluid, such as a drilling fluid, is pumped in above the plug 12, which should pump the plug 12 past the coils 20, 22.

The foregoing operation of the valves 4, 6, 8, pumping, and fluids used are conventional and well-known. The operation of the present invention is as described hereinabove, and as summarized as follows.

After being initialized to a normally balanced state, the bridge circuit 26 is driven by an electrical signal generated by the oscillator 80. The electrical signal is sinusoidal and has a fundamental frequency. The bridge circuit 26, which is connected adjacent the flow path through the adapter coupling 18, is driven with the signal so that an output signal is provided from the bridge circuit 26 when the bridge circuit 26 becomes unbalanced in response to metal moving through the flow path past the bridge circuit 26. Although the bridge circuit 26 becomes unbalanced when metal passes, thereby changing the impedance of the bridge circuit 26, the preferred embodiment of the present invention produces an output signal specifically having a spectrum containing the fundamental frequency and related harmonics of the fundamental (as opposed to having a change only in amplitude or phase) only in response to a passing plug. This is preferably achieved by using a particular metal of the type described above, which metal reacts with the bridge circuit 26 differently than the other types of metal which are typically in fluids pumped into an oil or gas well within the context of the present invention. That is, such other metals may cause a bridge unbalance and an output signal having a changed amplitude or phase, but not one having a harmonic content. When an output signal having a predetermined harmonic is produced, it is sensed in the present invention and an indication thereof given. In the particular implementation shown in FIG. 5, the harmonic sensed is the third harmonic because it is more distant from the fundamental frequency than the second harmonic and yet strong enough to be readily distinguishable and thus detectable.

Regarding the specific implementation shown in FIGS. 3–5, wherein the reference signals are used, the method of the present invention further comprises sensing that the output signal changes in a predetermined sequence relative to the two vertically spaced coils 20, 22 and indicating the passing of one of the plugs 10, 12 in response only to both sensing the harmonic in the output signal and sensing the output signal changing in the predetermined sequence. This is achieved in the circuit of the particular implementation shown in FIG. 5E as described above.

Changes in bridge inductance which occur in the present invention are very small. This results in only small signal to non-signal ratios in the order of 3 to 1 in the particular implementation of FIG. 5. Improved signal levels are obtained by using the magnetic saturation properties of the preferred amorphous metallic alloys. When a selected alloy driven by the magnetizing force of the current in the adjacent coil 20 or 22 reaches saturation, the back emf induced in the coil is non-linear. This distorts the sinusoidal oscillator signal to produce harmonics in the bridge output signal. A bandpass filter is used to selectively amplify a selected one of these harmonics (i.e., the third harmonic in the particular implementation described above). The resulting signal to non-signal ratio is improved to a factor of better than 20 to 1 in the particular implementation of FIG. 5. This allows for very small amounts of metal foil to be used as the metallic members 24 in the plugs 10, 12 while maintaining a reliable detection signal level.

Thus, the present invention is well adapted to carry out the objectives and attain the ends and advantages mentioned above as well as those inherent therein. While the preferred embodiment of the invention has been described for the purpose of this disclosure, changes in the construction and arrangement of parts and the performance of steps can be made by those skilled in the art, which changes are encompassed within the spirit of this invention as defined by the appended claims.

What is claimed is:

1. An apparatus for detecting the passing of a plug released into a well, comprising:

an electrical bridge circuit including a first electrical coil and a second electrical coil spaced at fixed locations along a course through which the plug passes in a single direction from an initial position above both said coils; and at least one metallic member mounted on the plug so that said at least one metallic member passes in effective proximity to both said first and second electrical coils as the plug passes both said first and second electrical coils in said single direction, wherein said at least one metallic member changes an electrical response of said electrical bridge circuit to an electrical response identifiable with said at least one metallic member when the plug passes both said first and second coils.

2. An apparatus as defined in claim 1, further comprising:

means for providing to said electrical bridge circuit an electrical signal having a fundamental frequency; and means for sensing an output signal from said electrical bridge circuit and for indicating when the output signal has a predetermined harmonic of the fundamental frequency.

3. An apparatus as defined in claim 2, wherein said at least one metallic member includes an element from the group consisting of nickel, iron, molybdenum, chromium, silicon, cobalt, boron, carbon and manganese.

4. An apparatus as defined in claim 2, wherein said at least one metallic member includes an amorphous metal.

5. An apparatus as defined in claim 1, wherein said at least one metallic member includes means for reacting with said first and second electrical coils so that an electrical output signal from said electrical bridge circuit is produced having an identifiable harmonic of a fundamental frequency of an electrical input signal to said electrical bridge circuit as the plug passes each of said first and second electrical coils.

6. An apparatus as defined in claim 5, wherein said means for reacting includes an element from the group consisting of nickel, iron, molybdenum, chromium, silicon, cobalt, boron, carbon and manganese.

7. An apparatus as defined in claim 5, wherein said means for reacting includes an amorphous metal.

8. An apparatus as defined in claim 5, further comprising:
a housing adapted to be connected to the well; and
a sleeve, having said first and second electrical coils mounted thereon, disposed in said housing so that interior axial openings through said housing and said sleeve are large enough to allow the plug to pass therethrough.

9. An apparatus as defined in claim 8, wherein said sleeve is cylindrical and said first and second electrical coils are mounted on said sleeve so that said coils have equal radii and so that said coils are axially spaced from each other by a distance equal to one of the radii.

10. An apparatus as defined in claim 9, wherein:
said sleeve has a radially outer surface into which two circumferential grooves are defined for receiving said first and second electrical coils; and
said housing has defined therethrough at least one hole through which ends of said first and second electrical coils extend for connecting outside said housing as part of said electrical bridge circuit.

11. An apparatus as defined in claim 1, further comprising:
a housing adapted to be connected to the well; and
a sleeve, having said first and second electrical coils mounted thereon, disposed in said housing so that interior axial openings through said housing and said sleeve are large enough to allow the plug to pass therethrough.

12. An apparatus as defined in claim 11, wherein said sleeve is cylindrical and said first and second electrical coils are mounted on said sleeve so that said coils have equal radii and so that said coils are axially spaced from each other by a distance equal to one of the radii.

13. An apparatus as defined in claim 12, wherein:
said sleeve has a radially outer surface into which two circumferential grooves are defined for receiving said first and second electrical coils; and
said housing has defined therethrough at least one hole through which ends of said first and second electrical coils extend for connecting outside said housing as part of said electrical bridge circuit.

14. An apparatus as defined in claim 13, further comprising:
means for providing to said electrical bridge circuit an electrical signal having a fundamental frequency; and
means for sensing an output signal from said electrical bridge circuit and for indicating when the output signal has a predetermined harmonic of the fundamental frequency.

15. An apparatus as defined in claim 14, wherein said at least one metallic member includes an element from the group consisting of nickel, iron, molybdenum, chromium, silicon, cobalt, boron, carbon and manganese.

16. An apparatus as defined in claim 14, wherein said at least one metallic member includes an amorphous metal.

17. An apparatus as defined in claim 1, wherein said at least one metallic member includes an element from the group consisting of nickel, iron, molybdenum, chromium, silicon, cobalt, boron, carbon and manganese.

18. An apparatus as defined in claim 1, wherein said at least one metallic member includes an amorphous metal.

19. An apparatus for detecting the passing of a cementing plug pumped into a well with a column of cement containing different metals, comprising:
a bridge circuit, including:
two electrical coils disposed outside a path through which the plug and cement are pumped in a single direction into the well, said two coils spaced longitudinally from each other relative to said single direction but connected in electrical series with each other; and
two series connected electrical resistances connected in electrical parallel with said two electrical coils;
an oscillator circuit connected across said bridge circuit in electrical parallel with said parallel connected electrical coils and resistances, said oscillator circuit including means for providing an electrical input signal, having a fundamental frequency, to said bridge circuit so that no signal is output from said bridge circuit from between said series connected electrical coils to between said series connected resistances when said bridge circuit is in electrical balance with the plug disposed longitudinally above both said coils relative to said single direction and so that a signal is output from said bridge circuit from between said series connected electrical coils to between said series connected resistances when said bridge circuit is not in electrical balance in response to metal passing said coils and thereby changing the conductivity of said bridge circuit;
an amorphous metallic alloy disposed on the plug for changing the impedance of said bridge circuit so that an output signal is provided from said bridge circuit when the plug passes both said coils in said single direction and additionally for effecting in said output signal a frequency which is a harmonic of the fundamental frequency of said input signal; and
means, connected to said bridge circuit, for sensing the harmonic frequency and for indicating in response thereto that the plug has passed both said electrical coils in said single direction.

20. An apparatus as defined in claim 19, wherein:
said apparatus further comprises means for providing a first reference signal relative to one of said electrical coils and for providing a second reference signal relative to the other of said electrical coils; and said means for sensing includes means, responsive to said output signal from said bridge circuit and to said first and second reference signals, for detecting the harmonic frequency and a predetermined sequence of change in said output signal from said bridge circuit as defining that the plug has passed both said electrical coils.

21. An apparatus as defined in claim 20, wherein said means for sensing further includes means, connected to said bridge circuit and said means for detecting the harmonic frequency and the predetermined sequence of change in said output signal, for amplifying said output signal and for filtering out the fundamental frequency of said input signal.

22. An apparatus as defined in claim 21, further comprising:
a housing adapted to be connected to the well; and
a sleeve, having said two electrical coils mounted thereon, disposed in said housing so that interior axial openings through said housing and said sleeve are large enough to allow the plug to pass therethrough.

23. An apparatus as defined in claim 22, wherein said sleeve is cylindrical and said two electrical coils are mounted on said sleeve so that said coils have equal radii and so that said coils are axially spaced from each other by a distance equal to one of the radii.

24. An apparatus as defined in claim 21, wherein said amorphous metallic alloy includes an element from the group consisting of nickel, iron, molybdenum, chromium, silicon, cobalt, boron, carbon and manganese.

25. An apparatus as defined in claim 19, wherein said amorphous metallic alloy includes an element from the group consisting of nickel, iron, molybdenum, chromium, silicon, cobalt, boron, carbon and manganese.

26. A method of detecting a plug passing a predetermined location along a flow path of a well, comprising:
generating at the well an electrical signal having a fundamental frequency;
driving an electrical bridge circuit, connected adjacent the flow path, with the electrical signal;
pumping a fluid against the plug so that the fluid and the plug move in a single direction through the flow path past the bridge circuit;
generating an output signal from the bridge circuit in response to metal in the fluid or the plug moving sequentially past two coils of the bridge circuit, including producing in the output signal from the bridge circuit a harmonic of the fundamental frequency in response only to the plug passing the two coils of the bridge circuit; and
sensing the harmonic in the output signal.

27. A method as defined in claim 26, further comprising:
sensing that the output signal changes in a predetermined sequence relative to upper and lower electrical coils of the ridge circuit mounted along the flow path; and
indicating the passing of the plug in response only to both sensing the harmonic in the output signal and sensing the output signal changing in the predetermined sequence.

28. A method as defined in claim 27, wherein producing in the output signal from the bridge circuit a harmonic of the fundamental frequency includes using a plug having an amorphous metallic member.

29. A method as defined in claim 28, wherein the amorphous metallic member comprises an alloy including at least one metal from the group consisting of nickel, iron, molybdenum, chromium, silicon, cobalt, boron, carbon and manganese.

30. A method as defined in claim 26, wherein producing in the output signal from the bridge circuit a harmonic of the fundamental frequency includes using a plug having an amorphous metallic member.

31. A method as defined in claim 30, wherein the amorphous metallic member comprises an alloy including at least one metal from the group consisting of nickel, iron, molybdenum, chromium, silicon, cobalt, boron, carbon and manganese.

32. In a system wherein a plug container is connected to an oil or gas well so that a metal-containing fluid pumped into the plug container against a plug contained in the plug container moves the plug downwardly towards the well when the plug is released from the plug container, an apparatus for detecting that the plug has successfully released from the plug container, comprising:
an adapter coupling member connected below the plug container and above the well for defining at least part of a flow path through which the metal-containing fluid and the plug are to move into the well;
a distinctive metal, different from metal in the metal-containing fluid, mounted in the plug; and
an electrical bridge circuit including a first electrical coil and a second electrical coil retained at respective fixed locations along said adapter coupling member, each of said coils encircling said flow path but disposed outside said flow path so that the fluid and a successfully released plug move through both said coils as the fluid and successfully released plug move from the plug container into the well, said electrical bridge circuit providing a first electrical response to metal in the fluid moving past said first and second coils and said electrical bridge circuit providing a second electrical response to said distinctive metal in the plug moving past both said first and second coils, said second electrical response adapted for indicating that the plug has successfully released from the plug container.

* * * * *